United States Patent [19]

Hiyama

[11] Patent Number: 4,708,317

[45] Date of Patent: Nov. 24, 1987

[54] ELECTROMAGNETIC ACTUATOR

[75] Inventor: Yasuhiro Hiyama, Higashimatsuyama, Japan

[73] Assignee: Diesel Kiki Co., Ltd., Tokyo, Japan

[21] Appl. No.: 807,803

[22] Filed: Dec. 11, 1985

[30] Foreign Application Priority Data

Dec. 15, 1984 [JP] Japan ............................... 59-263769

[51] Int. Cl.[4] ........................ B05B 1/30; F16K 31/02; H01F 7/08; H01F 7/00

[52] U.S. Cl. ............................... 251/129.16; 335/234; 335/267; 335/281; 239/585

[58] Field of Search ................... 239/585; 251/129.15, 251/129.16; 310/12, 13, 14; 335/234, 281, 267

[56] References Cited

U.S. PATENT DOCUMENTS

| | | | |
|---|---|---|---|
| 3,623,460 | 11/1971 | Komaroff | 239/585 |
| 4,156,506 | 5/1979 | Locke et al. | 239/585 |
| 4,553,121 | 11/1985 | Logie | 335/281 |
| 4,626,814 | 12/1986 | Montuschi et al. | 335/281 |
| 4,643,223 | 2/1987 | Abe et al. | 251/129.16 |

FOREIGN PATENT DOCUMENTS

| | | | |
|---|---|---|---|
| 2701607 | 7/1977 | Fed. Rep. of Germany | 335/267 |
| 2701608 | 7/1977 | Fed. Rep. of Germany | 335/267 |

*Primary Examiner*—Andres Kashnikow
*Assistant Examiner*—Patrick N. Burkhart
*Attorney, Agent, or Firm*—Birch, Stewart, Kolasch & Birch

[57] ABSTRACT

The electromagnetic actuator has fixed and movable electromagnets. Each of both electromagnets has a plurality of slots formed in a substantially flat plane of a core member, and coil elements disposed in each slot so that directions of current in each slot are reversed alternately. The fixed and movable electromagnets are housed in a housing, with the respective slot-formed planes facing each other. Both electromagnets are excited at the same time, and resultant magnetic attraction or repulsion between both electromagnets causes the movable magnet to move. The movement of the movable magnet is derived by pickup means. By means of the utilization of attraction and repulsion between the electromagnets, a high speed operation can be achieved.

6 Claims, 6 Drawing Figures

(B)

(A)

(B)

(A)

ELECTROMAGNETIC ACTUATOR

BACKGROUND OF THE INVENTION

The present invention relates to an electromagnetic actuator applicable to an electromagnetic appliance such as an electromagnetic valve.

An example of a prior art relevant to the present invention has been shown in the U.S. Pat. No. 4,156,506, the British Pat. No. 1,599,525 or the West German patent Laid Open Publication No. 2,812,739. In this prior art reference, there are provided a disk made of magnetic material and serving as a valve for opening or closing a fuel outlet, and an electromagnet fixedly mounted so that its pole-face is opposed to the disk. The disk receives the pressure of fuel so as to close the fuel outlet. The electromagnet has a core member which has a substantially flat plane opposit to the disk. In the flat plane of the core member, a plurality of grooves are formed in concentric circles as an example. A winding is disposed in the grooves so that directions of current in each groove are reversed alternately, i.e. the direction of current in one groove is different from the direction of current in an adjacent groove of said one groove. In such construction, an opening of the fuel outlet is effected by attracting the disk by means of the excitation of the electromagnet, while a closing of the fuel outlet is effected by pushing back the disk to the close position by means of the fuel pressure under the non-excitation of the electromagnet.

However, said prior art has the disadvantage that the response speed is rather slow, since it is necessary to attract the disk against the fuel pressure and the fluid resistance, and the closing operation depends on the fuel pressure. Therefore, there is a fear that a desired response cannot be achieved particularly in those cases that a high speed response is required.

SUMMARY OF THE INVENTION

It is an object, therefore, of the present invention to overcome the disadvantages and limitations of a prior art by providing a new and improved electromagnetic actuator.

It is another object of the present invention to provide an electromagnetic actuator which can operate with a high speed response.

The above and other objects are attained by an electromagnetic actuator comprising a fixed electromagnet having a plurality of slots formed in a substantially flat plane of a core member, and coil elements disposed in each slot so that directions of current in each slot are reversed alternately; a movable electromagnet having a plurality of slots formed in a substantially flat plane of a core member so as to correspond in position with the slots of the fixed electromagnet, and coil elements disposed in each slot of said movable electromagnet so that directions of current in each slot are reversed alternately; a housing for housing said fixed and movable electromagnets so that the slot-formed plane of said fixed electromagnet faces the slot-formed plane of said movable electromagnet, and that said movable electromagnet is movable in relation to said fixed electromagnet; and means for deriving the movement of said movable electromagnet actuated by the magnetic attraction or repulsion force which is generated by means of the simultaneous excitation of said electromagnets.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE INVENTION

Figure 1:
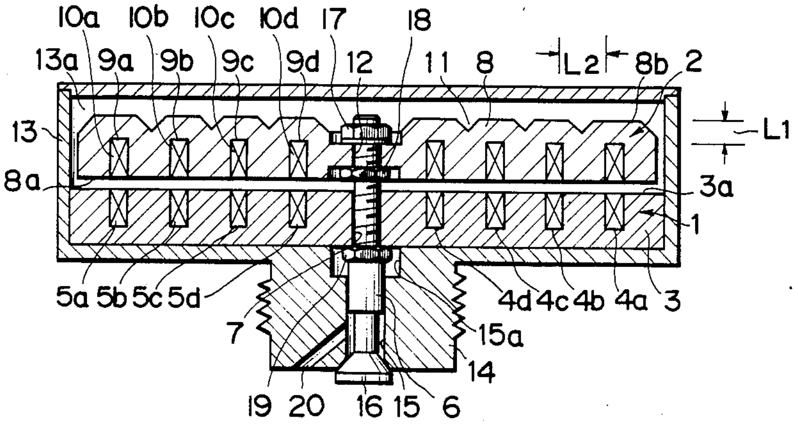
FIG. 1 is a cross-sectional side view showing the construction of an embodiment of the electromagnetic actuator according to the present invention.
Figure 2:
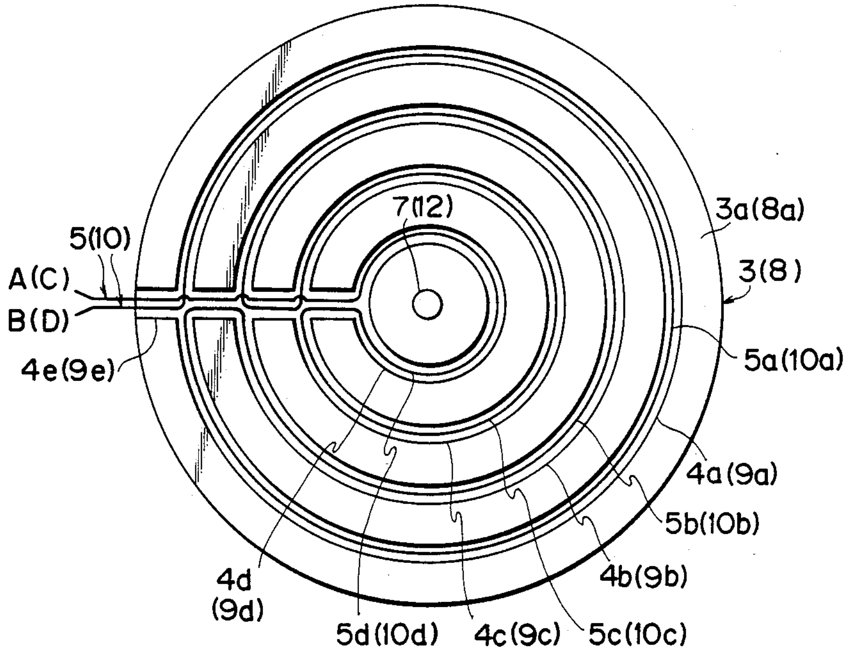
FIG. 2 is a schematic diagram showing an example of the coil arrangement of the fixed and movable electromagnets shown in FIG. 1.

FIG. 1 shows an embodiment of the electromagnetic actuator according to the present invention, and FIG. 2 shows the winding arrangement of the fixed and movable electromagnets shown in FIG. 1. In this embodiment, the electromagnetic actuator of FIG. 1 is applied to an electromagnetic valve. In FIGS. 1 and 2, the reference numeral 1 is the fixed electromagnet, and the reference numeral 2 is the movable electromagnet.

The fixed electromagnet 1 has a disk-shaped core member 3 which is made of soft iron or other magnetic material. The core member 3 has a circular flat plane 3*a* in one side. In the circular plane 3*a,* four annular slots 4*a,* 4*b,* 4*c* and 4*d* are formed in concentrical arrangement with respect to the circular plane 3*a.* The slots 4*a* through 4*d* are disposed at equal intervals in order toward the center of the circular plane 3*a.* In each of the slots 4*a* through 4*d,* a coil 5 of single turn or more turns is disposed through a groove 4*e* formed radially in the plane 3*a.* The coil 5 is disposed in each slot 4*a* through 4*d* so that directions of current in each slot 4*a* through 4*d* are reversed alternately. In this embodiment, the coil elements 5*a* and 5*c* respectively in the slots 4*a* and 4*c* are wound clockwise, whereas the coil elements 5*b* and 5*d* respectively in the slots 4*b* and 4*d* are wound counterclockwise. Therefore, when a DC current is applied between terminals A and B of the coil 5 taken out via the groove 4*e* the outside of the core member 3, the directions of current in the coil elements 5*a* and 5*c* become opposite to the directions of current in the coil elements 5*b* and 5*d.* As a result, each of five annular planes which are defined on the circular plane 3*a* by the slots 4*a* through 4*d* is magnetized to have an opposite polarity alternately. In center portion of the core member 3, a through hole 7 which accepts a valve shaft 6 so as to permit it to move easily is formed.

The movable electromagnet 3 includes a disk-shaped core member 8 which is made of soft iron or other magnetic material. The core member 8 has, similarly to the core member 3 of the fixed electromagnet 1, a circular flat plane 8*a* in which four annular slots 9*a,* 9*b,* 9*c* and 9*d* are formed in concentrical arrangement with respect to the circular plane 8*a*. The slots 9*a* through 9*d* are disposed at equal spaces in order toward the center of the circular plane 8*a* so as to correspond in position with the slots 4*a* through 4*d* of the fixed electromagnet 1. A coil 10 of single turn or more turns is disposed in each of the slots 9*a* through 9*d* through a groove 9*e* formed radially in the plane 8*a*. The coil 10 is disposed in each slot 9*a* through 9*d*, similarly to the arrangement of the coil 5 of the fixed electromagnet 1. That is to say, the coil elements 10*a* and 10*c* respectively in the slots 9*a* and 9*c* are wound clockwise, whereas the coil elements 10*b* and 10*d* respectively in the slots 9*b* and 9*d* are wound counterclockwise. Therefore, when a DC current is applied between terminals C and D of the coil 10, the circular plane 8*a* is magnetized similarly to the case of the fixed electromagnet 1. In order to make the core member 8 light in weight, the core member 8 is formed as this as possible so far as a magnetic circuit is obstructed, and also, annular notches 11 are formed in the circular plane 8*b* opposite to the plane 8*a*. The core member 8 may be constructed so that a distance $L_1$ between the bottom of each slot 9*a* through 9*d* and the circular plane 8*b* is $\frac{1}{2}$ of the distance $L_2$ between the slots 9*a* through 9*d*. The reason of this is that the magnetic flux passing through between the bottom of each slot and the circular plane 8*b* is half of the magnetic flux passing through between the slots. Each notch 11 in the circular plane 8*b* is formed so as to be positioned at the approximately middle portion between the slots, and the depth of the notches 11 is selected so that the portion which is not effective very much as a magnetic path is ridded. In the center portion of the core member 8, a through hole 12 which accepts the valve shaft 6 is formed. In the circular planes 8*a* and 8*b* of the core member 8 at the peripheries of the through hole 12, recesses are formed.

The fixed and movable electromagnets 1 and 2 constructed as above are housed in a housing 13 with the slot-formed planes 3*a* and 8*a* facing each other, as shown in FIG. 1. The housing 13 has a cylindrical space 13*a* and can be opened by removing its upper member. The fixed electromagnet 1 is fixedly mounted on the inner bottom surface of the housing 13 so that the slot-formed plane 3*a* faces the inner top surface of the housing 13. The housing 13 has dimensions so as to permit the movement of the movable electromagnet 2. The coils 5 and 10 of the electromagnets 1 and 2 are led outwardly of the housing 13. The coil 10 of the movable electromagnet 2 has for example a surplus portion in the inside of the housing 13, so as not to interfere the movement of the movable electromagnet 2.

In the bottom portion of the housing 13, there is provided a valve section 14. In the valve section 14, a through hole 15 is formed so as to communicate with the through holes 7 and 12 in the electromagnets 1 and 2. The valve shaft 6 is provided through the through holes 7, 12 and 15. In the valve shaft 6, there are provided a valve head 16, and nuts 17, 18 and 19. The valve head 16 is formed at one end of the shaft 6. The through hole 15 has a valve seat for the valve head 16 at its lower portion. The valve head 16 operates to close or open the outlet of the valve section 14 by means of the up/down motion of the valve shaft 6. The valve shaft 6 is fixedly connected to the movable electromagnet 2 by means of two nuts 17 and 18 rest on the recesses formed in the circular planes 8*a* and 8*b* of the core member 8. The nut 19 is provided in a space 15*a*, which is formed at the upper portion of the through hole 15, having a larger diameter than the through hole 15. The upper surface of the space 15*a* is defined by the lower surface of the fixed electromagnet 1. The nut 19, in cooperative association with the space 15*a*, functions as a stopper for the up/down motion of the movable electromagnet 2. It is of course that the length of the shaft 6 is determined so that the opening and closing operations of the valve head 16 is performed by the up/down motion of the movable electromagnet 2.

The valve section 14 has an inlet path 20 for fluid. In this embodiment, the fluid is introduced via the inlet path 20 to the through hole 15, and expelled out from the lower portion of the through hole 15 via the valve head 16. Therefore, no fluid is permitted to enter the cylindrical space 13*a* where the electromagnets 1 and 2 are housed, so that the movable electromagnet 2 is never subjected to the pressure and resistance of fluid.

Figure 3:
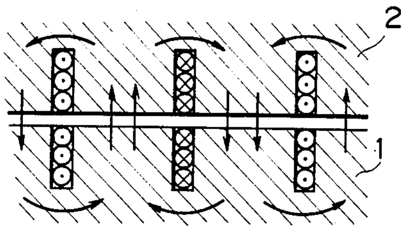
FIG. 3(A) shows an example of drive current waveforms applied to the fixed and movable electromagnets of FIG. 1 when making the attraction force generate between them.
FIG. 3(B) is an explanatory drawing for explaining the attraction operation.
Figure 3:
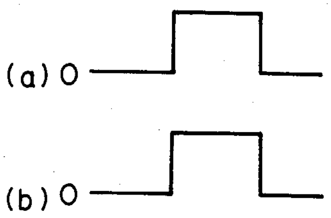
Figure 4:
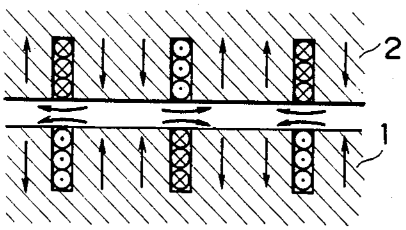
FIG. 4(A) shows an example of drive current waveforms applied to the fixed and movable electromagnets of FIG. 1 when making the repulsion force generate between them.
FIG. 4(B) is an explanatory drawing for explaining the repulsion operation.
Figure 4:
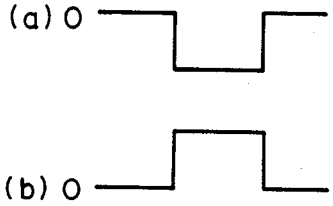

To open the valve head 16, drive currents (a) and (b) in the same direction as shown in FIG. 3(A) are applied at the same time to the coils 10 and 5 of the movable and fixed electromagnets 2 and 1. The drive current (a) is applied to the coil 10 of the movable electromagnet 2 so that the current flows from the terminal D to the terminal C. The drive current (b) is applied to the coil 5 of the fixed electromagnet 1 so that the current flows from the terminal A to the terminal B. Contrary to this, the drive current (a) may be applied so that it flows from the terminal C to the terminal D of the coil 10 of the movable electromagnet 2, and the drive current (b) may accordingly be applied so that it flows from the terminal B to the terminal A of the coil 5 of the fixed electromagnet 1. Consequently, as shown in FIG. 3(B), the directions of current flowing through each coil element 5*a* through 5*d* disposed in the slots 4*a* through 4*d* become the same as those flowing through each coil element 10*a* through 10*d* disposed in the slots 9*a* through 9*d*. In FIG. 3(B) and FIG. 4(B), the direction of the current flowing through the coil is indicated by symbols "." and "X". Since the directions of currents flowing through the coil elements 5*a* through 5*d* of the fixed electromagnet 1 and the coil elements 10*a* through 10*d* of the movable electromagnet 2 are the same, the polarity of magnetic pole generated in each annular plane on the circular plane 3*a* becomes opposite to the polarity of magnetic pole generated in each corresponding annular plane on the circular plane 8*a*. That is, if one annular plane of the circular plane 3*a* is N-pole, one annular plane of the circular plane 8*a*, which faces said one annular plane of the circular plane 3*a*, is S-pole. Therefore, a large magnetic attraction force is generated between the fixed and movable electromagnets 1 and 2, thereby the movable electromagnet 2 is attracted toward the fixed electromagnet 1. As a result, the valve shaft 6 moves downward, and the valve head 16 is opened.

To close the valve head 16, drive currents (a) and (b) opposite in direction to each other as shown in FIG. 4(A) are applied at the same time to the coils 10 and 5 of the movable and fixed electromagnets 2 and 1. In the present embodiment, the direction of drive current (b) remains as it is, while the direction of drive current (a) applied to the movable electromagnet 2 is changed. Contrary to this, the direction of drive current (a) may remain as it is, and the direction of drive current (b) to be applied to the fixed electromagnet 1 may accordingly be changed. By changing the direction of either one of the drive currents (a), (b), the directions of current flowing through the coil elements 5*a* through 5*d* and through the coil elements 10*a* through 10*d* become opposite to each other, as shown in FIG. 4(B). Thus, the polarity of magnetic pole generated in each annular plane of the circular plane 3*a* of the fixed electromagnet 1 becomes the same as that generated in each corresponding annular plane on the circular plane 8*a* of the movable electromagnet 2. Thus, a large magnetic repulsion force is generated between the fixed and movable electromagnets 1 and 2, thereby the movable electromagnet 2 is repelled from the fixed electromagnet 1. Consequently, the valve shaft 6 moves upward, and the valve head 16 is closed.

In the above embodiment, the coil elements 5*a* through 5*d* are connected in series, and the coil elements 10*a* through 10*d* are also connected in series. It is of course possible that they are connected in parallel. The present invention is not intended to be limited to the electromagnetic valve. The present invention can widely be applicable to other electromagnetic appliances.

As described above in detail, the electromagnetic actuator according to the present invention is constructed so that the magnetic attraction and repulsion between the fixed and movable electromagnets are utilized, and the movement of the movable electromagnet is not affected by the pressure and resistance of fluid. Therefore, the present electromagnetic actuator may be operated at a high speed as compared with the conventional electromagnetic device. Furthermore, since the magnetic repulsion force which has not been used with the conventional device is positively utilized, a more effective use of electromagnets is possible.

From the foregoing it will now be apparent that a new and improved electromagnetic actuator has been found. It should be understood of course that the embodiments disclosed are merely illustrative and are not intended to limit the scope of the invention. Reference should be made to the appended claims, therefore, rather than the specification, to determine the scope of the invention.

What is claimed is:

1. An electromagnetic actuator comprising:

a housing;

a fixed electromagnet fixed to said housing and having a core member having a substantially flat surface plane with a plurality of slots formed therein, and coil elements disposed in each slot so that directions of current in adjacent slots are reversed;

a moveable electromagnet moveably mounted in said housing and having a core member having a substantially flat surface plane with a plurality of slots formed therein, and coil elements disposed in each slot so that directions of current in adjacent slots are reversed;

said substantially flat surface planes of said fixed electromagnet and said moveable electromagnet being juxtaposed and said slots being located in opposed corresponding positions in said fixed electromagnet and moveable electromagnet;

said moveable electromagnet moving with respect to said fixed electromagnet in response to generation of magnetic attraction or repulsion forces in said fixed and moveable electromagnets generated by simultaneous excitation of their respective coils; and mechanical output means including a shaft having a first end coupled to said moveable electromagnet, said shaft being shifted by the motion of said moveable electromagnet to develop a mechanical output of said actuator.

2. The acutator of claim 1 wherein said shaft extends through the core member of said fixed electromagnet and outside the housing, said moveable electromagnet moving up and down to shift said shaft in a axial direction.

3. An electromagnetic actuator of claim 2, wherein the core members of said fixed and movable electromagnets are disk-shaped and wherein the annular slots are formed in equidistant concentric arrangement, the disk-shaped core member of said movable electromagnet being formed so that the thickness ($L_1$) between the bottom of each slot and the plane opposite to said slot-formed plane is approximately ½ of the distance ($L_2$) between the slots.

4. An electromagnetic actuator of claim 3, wherein annular notches are formed in the plane opposite to the slot-formed plane of said movable electromagnet so as to be positioned at the approximately middle portion between the slots.

5. An electromagnetic actuator of claim 2, wherein said shaft includes a valve head provided at its end remote from the first end, and wherein said housing has a valve section which is provided with an opening opened or closed by said valve head.

6. An electromagnetic actuator of claim 1, wherein said coil elements disposed in said slots of each of both electromagnets are connected in series.

* * * * *